United States Patent [19]
Ueno et al.

[11] Patent Number: 5,990,962
[45] Date of Patent: Nov. 23, 1999

[54] VIDEO PREPROCESSING DEVICE WITH MOTION COMPENSATION PREDICTION PROCESSING SIMILAR TO THAT OF A MAIN PREDICTION PROCESSING DEVICE

[75] Inventors: Hideyuki Ueno, Tokyo; Masami Akamine, Yokosuka, both of Japan

[73] Assignee: Kabushiki Kaisha Toshiba, Kawasaki, Japan

[21] Appl. No.: 09/056,623

[22] Filed: Apr. 8, 1998

Related U.S. Application Data

[63] Continuation of application No. 08/496,316, Jun. 29, 1995, Pat. No. 5,786,859.

[30] Foreign Application Priority Data

Jun. 30, 1994 [JP] Japan .................................... 6-149726

[51] Int. Cl.⁶ .................................................. H04N 7/32
[52] U.S. Cl. ......................................... 348/416; 348/699
[58] Field of Search .................................. 348/384, 390, 348/400–402, 407, 409–413, 415, 416, 420, 699; 382/232, 236, 238; H04N 7/137, 7/32

[56] References Cited

U.S. PATENT DOCUMENTS

| | | |
|---|---|---|
| 4,591,909 | 5/1986 | Kuroda et al. . |
| 4,757,383 | 7/1988 | Tanaka . |
| 4,958,226 | 9/1990 | Haskell et al. . |
| 5,109,451 | 4/1992 | Aono et al. . |
| 5,150,432 | 9/1992 | Ueno et al. . |
| 5,299,019 | 3/1994 | Pack et al. . |
| 5,361,105 | 11/1994 | Lu . |
| 5,367,629 | 11/1994 | Chu et al. . |
| 5,430,490 | 7/1995 | Rim . |
| 5,461,423 | 10/1995 | Tsukagoshi . |
| 5,467,135 | 11/1995 | Yamane et al. . |
| 5,502,510 | 3/1996 | Kim et al. . |
| 5,512,956 | 4/1996 | Yan . |
| 5,640,208 | 6/1997 | Fujinami .................................. 348/699 |
| 5,699,120 | 12/1997 | Case et al. .............................. 348/699 |

OTHER PUBLICATIONS

PCSJ, Oct. 1992, A Study of Adaptive Pre–filtering for Video Coding, Yasuhiro Takishima etal., pp. 221–224.

IEEE, May 1991, Motion Compensation for Video Compression Using Control Grid Interpolation, Gary L. Sullivan et al., pp. 2713–2716.

Nakaya et al., A Basic Study on Motion Compensation with Triangles, Technical Report of IEICE, IE90–106, pp. 9–16, (Abstract only translation).

*Primary Examiner*—Richard Lee
*Attorney, Agent, or Firm*—Oblon, Spivak, McClelland, Maier & Neustadt, P.C.

[57] ABSTRACT

A preprocessing device used in a video coding apparatus, comprising a motion compensation prediction estimating unit for detecting a change of an video from a current picture and a past picture to generate change data, and a filter for deforming the current picture in accordance with the change data generated by the motion compensation prediction estimating circuit such that a deformed current picture is sent to a motion compensation prediction coding section of the video coding apparatus to be coded.

16 Claims, 9 Drawing Sheets

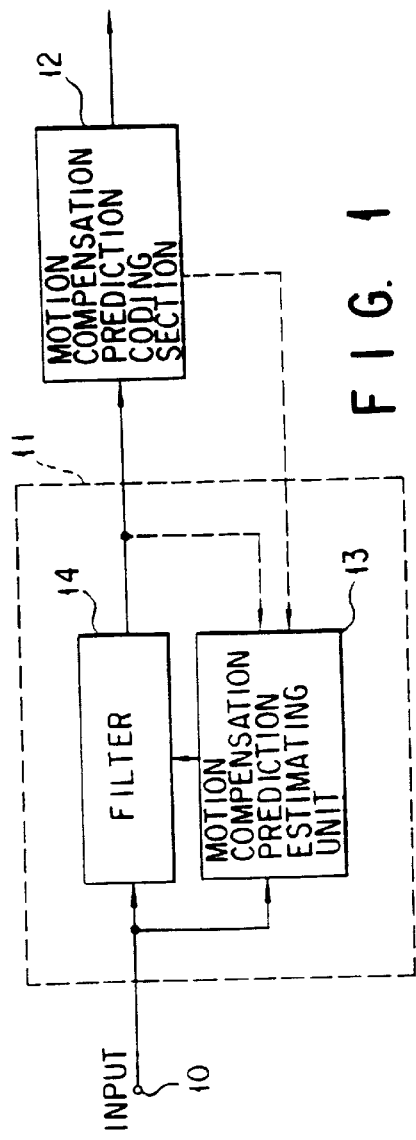
F I G. 1
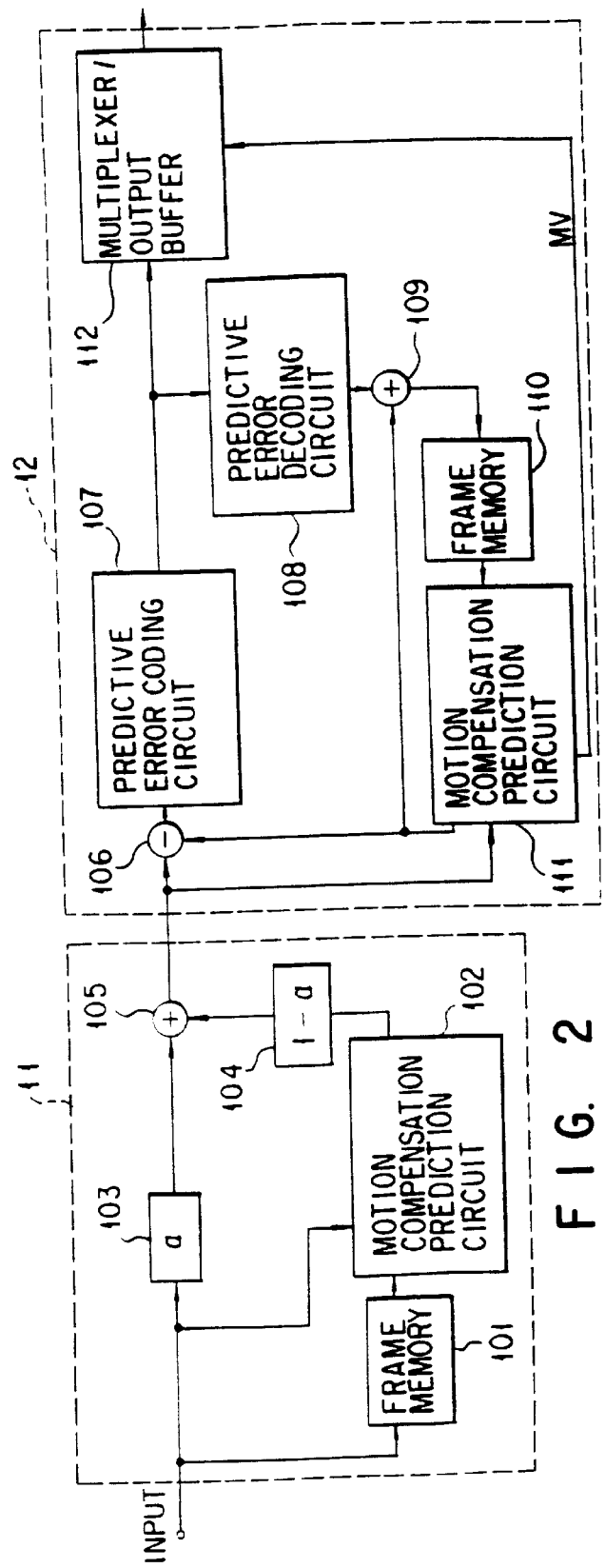
F I G. 2

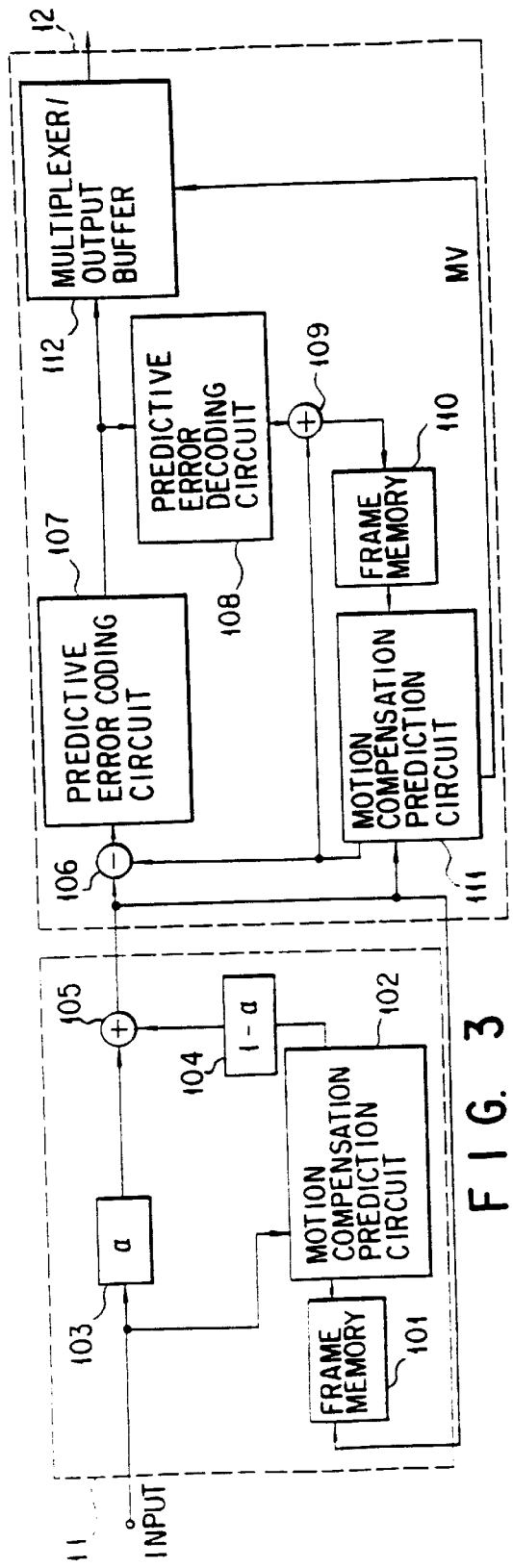
F I G. 3
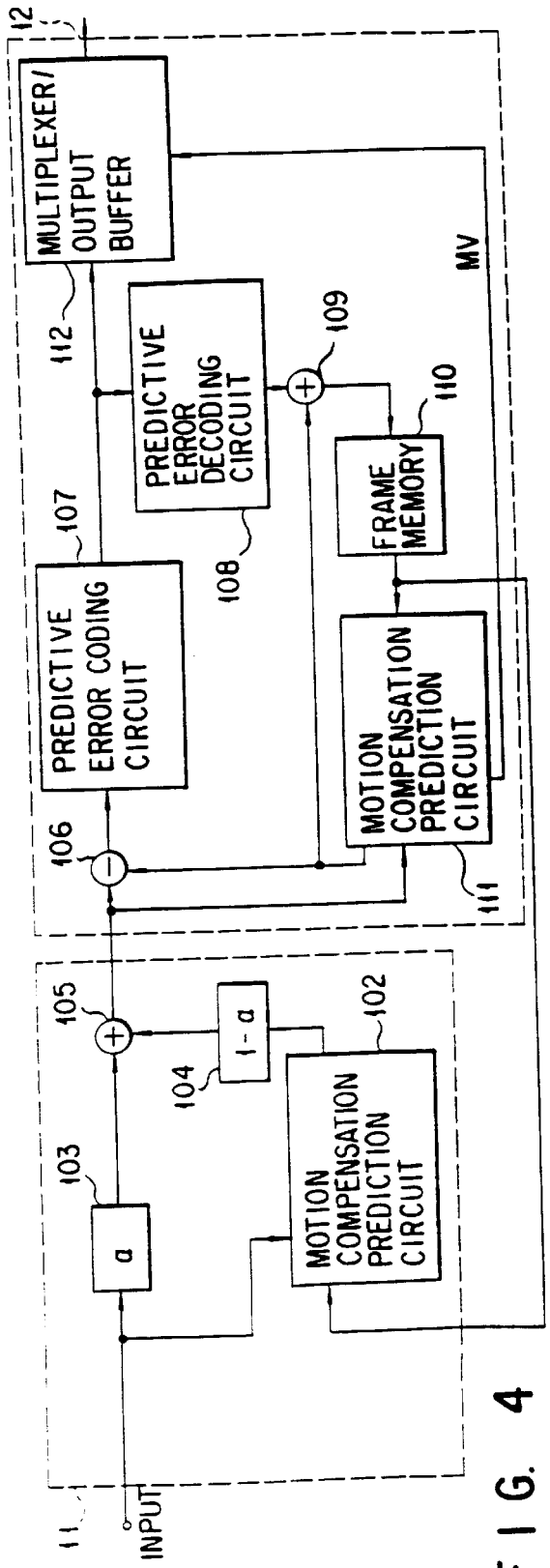
F I G. 4

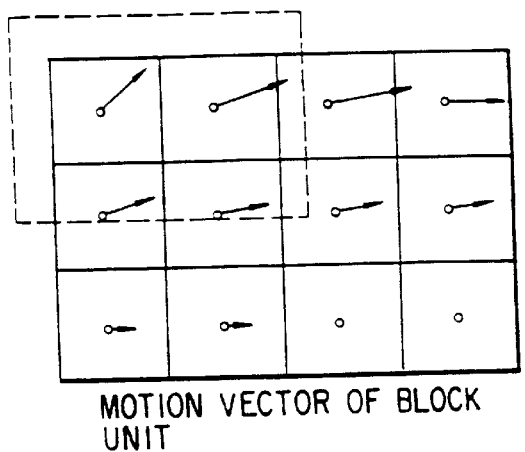
MOTION VECTOR OF BLOCK UNIT
F I G. 6A
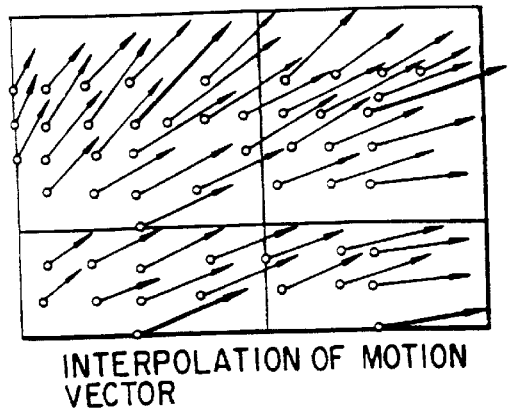
INTERPOLATION OF MOTION VECTOR
F I G. 6B
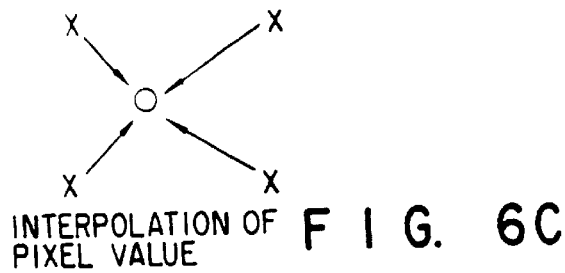
INTERPOLATION OF PIXEL VALUE
F I G. 6C
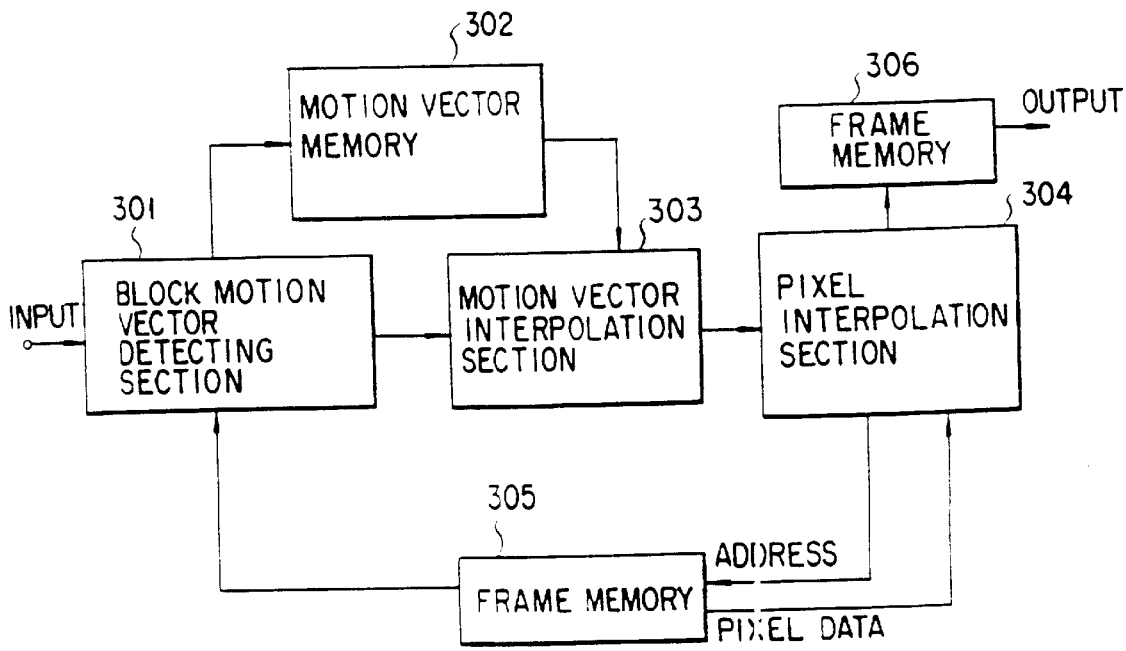
F I G. 7

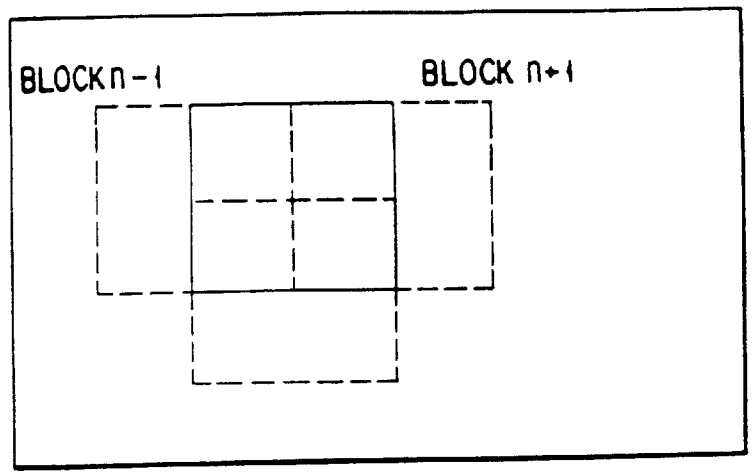
F I G. 8A
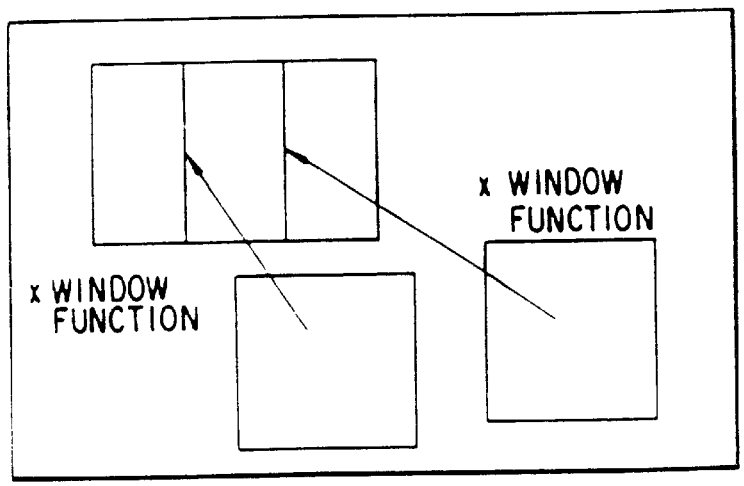
F I G. 8B
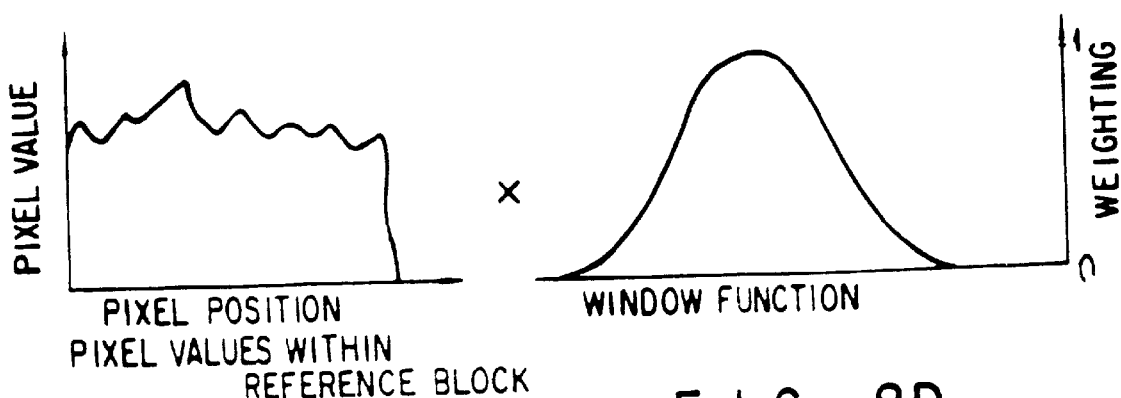
F I G. 8C
F I G. 8D

FIG. 8E ····· WINDOW FUNCTION

FIG. 8F REFERENCE BLOCK

FIG. 8G PREDICTIVE SIGNAL

INPUT

FIG. 11A

VALUE a   1   0   0   0   1   0   0   0   1   0 ...

FIG. 11B

SNR

FIG. 11C

CODING
OUTPUT
AMOUNT

FIG. 11D

INPUT

AFTER
MOTION
COMPENSATION

AFTER
PRE-PROCESSING

FIELD
NO.      1  2  3  4  5  6  7  8  9  10 11 12 13

FIG. 14

VIDEO PREPROCESSING DEVICE WITH MOTION COMPENSATION PREDICTION PROCESSING SIMILAR TO THAT OF A MAIN PREDICTION PROCESSING DEVICE

This application is a Continuation of application Ser. No. 08/496,316 filed on Jun. 29, 1995 now U.S. Pat. No. 5,786,859.

BACKGROUND OF THE INVENTION

1. Field of the Invention

The present invention relates to a video coding/decoding apparatus used in a video communication system such as a videophone, a video conference system, a system of a storage apparatus such as a digital VTR, a video disk, a broadcast system such as a terrestrial, a satellite, a CATV system.

2. Description of the Related Art

In each field of the broadcast system, the storage apparatus, and the video communication system, importance of a video coding for compression-coding a video signal with high efficiency has been considerably increased. In the filed of the broadcast system, there have been advanced the study and development in which the CATV broadcast, the satellite broadcast, and the terrestrial broadcast are digitized so as to realize the multi-channel broadcast, and diversity of service. In the field of the system of the storage apparatus, there have been advance the study and development of the digital VTR and digital video disk, which are applied to the present TV and a HDTV in the future. In the field of the video communication system, there have been advanced the study and development for realizing a multi-media communication through a broadband communication network. Moreover, in the field of the video communication system, a multi-media communication using a mobile radio communication network has been also studied. The former communication system is used in a relatively wide band. In contrast, the latter communication system is used in a finite radio band. Due to this, it is required that an amount of data be largely compressed in the transmission of the video signal.

In recent years, in the field of the video coding, there has been a trend in improving quality of prediction of a motion compensation prediction coding, which is currently performed by the parallel shift of blocks, in order to improve a compression ratio, that is, coding efficiency. One of these new techniques of motion compensation is called a patch motion compensation or a motion interpolation. More specifically, in this new the motion compensation, a motion vector corresponding to each pixel is calculated from motion vectors obtained for sample points by a linear interpolation (see "Basic Study on Motion Compensation with Triangles" by Nakaya, Harashima, Technical Report of IEICE, IE90-106, G. Sullivan, R. Baker, "Motion Compensation for Video Compensation Using Control Grid Interpolation" ICASSP '91, M9.1). According to these methods, since the motion can be set by a pixel unit even if the motion vector having the same amount of data as the conventional motion compensation coding system is sent, a predictive precision can be improved, and this can contribute to the compression ratio of video data. Moreover, since the basis of the conventional motion compensation coding system lies in the preparation of a predictive video signal by a block unit, there is a tendency to generate blocking artifacts in a decoded video signal. According to these methods, the predictive video signal is continuously generated, and no inter block gap in the video content is generated.

On the other hand, as a general technique in the video coding, it is needed that a coding output amount of an coding apparatus be smoothed, that is, a rate control for adjusting the coding output amount to a target coding output amount is required. According to the conventional video coding apparatus, a quantization step size is changed as viewing a storage amount (amount of occupation) of an output buffer so as to control the coding output amount. However, if there is used an orthogonal transform coding such as H. 261, which is an international standard system of video coding, and DCT used in MPEG, there is a problem in that the blocking artifacts are generated to largely deteriorate a subjective quality of video.

In order to solve the above problem, there is known a rate control using a low-pass filter, for example, "Review of Variable Pre-filter Control System in Video Coding" by Takishima, Wada, PCSJ'92 6.6). This technique explains that not only the quantization step size but also resolution of an input video signal before being coded is reduced so as to control the coding output amount. As compared with the rate control in which the coding output amount is controlled by only the quantization step size, resolution of the large motion video drops, but the blocking artifacts can be reduced, so that the subjective quality can be improved.

Among the above-mentioned prior art, regarding the patch motion compensation and the motion interpolation, the prediction quality in the small motion of the video can be improved, and the coding efficiency can be also improved. However, regarding the large motion of the video in which motion compensation cannot be performed, influence of its deformation is exerted on the large area. As a result, there may be a case that a prediction error is increased, and the coding efficiency is reduced. Particularly, in the case of a change of a scene in which the motion compensation does not originally work, no improvement is made.

The motion vector is normally detected by comparing the input video signal and the decoded video signal. Due to this, in a case where the coding is performed at a low bit rate, a suitable motion vector cannot be easily detected by deterioration of the decoded video signal due to influence of coding noise, unfavorable influence is exerted on the predictive video. Moreover, for obtaining the motion vector suitable for the patch motion compensation and the motion interpolation, the motion vector, which is obtained by the block matching, which is the conventional vector detection system, is set as an initial value, and the motion vector is optimized by an iterative operation. Due to this, the amount of calculations are largely increased.

On the other hand, in the rate control using the low-pass filter, since the filter is passed over the entire screen, there is a problem in that deterioration is prominent when resolution largely drops. Particularly, in a case where the large motion and deformation are formed in only a part of the area of the same video, resolution of the small motion area where the coding output amount does not become large is dropped. Due to this, the subjective quality is caused to be reduced as visual deterioration.

SUMMARY OF THE INVENTION

An object of the present invention is to provide a preprocessing device which deforms a current picture in accordance with a change from a past picture to the current picture so that an input video can be easily coded without mismatching a motion compensation prediction.

Another object of the present invention is to provide a video coding/decoding apparatus wherein a video having a large motion or a large deformation by which a coding output amount is originally increased, or a video obtained by a scene change can be deformed to a video which can be easily coded, by use of visual characteristics, for smoothing the coding output amount without dropping a subjective video quality, so that the subjective video quality and the coding efficient can be improved.

According to the present invention, there is provided a preprocessing device used in a video coding apparatus, comprising change data generating means for detecting a change of an video from a current picture and a past picture to generate change data, and current picture deforming means for deforming the current picture in accordance with the change data generated by the change data generating means such that a deformed current picture is sent to a motion compensation prediction coding section of the video coding apparatus to be coded.

Also, according to the present invention, there is provided a video coding apparatus comprising a video preprocessing section having a first motion compensation prediction circuit for comparing a current picture signal and a past picture signal to generate a motion compensation predictive signal predicting the current picture from the past picture, and current picture processing means for processing the current picture signal to deform the current picture by the motion compensation predictive signal, and a motion compensation prediction coding section having a second motion compensation prediction circuit for subjecting a motion compensation prediction coding to the preprocessed picture signal to prepare a predictive picture of the current picture preprocessed by the preprocessing section, prediction error generating means for obtaining a difference between the predictive picture and the preprocessed current picture to generate a prediction error signal, and coding means for coding the predictive error signal to be output.

Moreover, according to the present invention, there is provided a video coding apparatus comprising a coding section for subjecting a motion compensation prediction coding to a video signal, and a preprocessing section, provided in a preceding stage of the coding section, for reducing resolution of a region of the input video signal according to a degree of a motion compensation prediction mismatch occurs in the region.

The above preprocessing section provides processing of reducing resolution of the input video signal by weighting and adding the current picture of the input video signal and a predictive picture signal obtained by a motion compensation prediction for the current picture signal by use of a past picture signal.

In this case, if the above preprocessing section uses the same motion compensation prediction method as that of the coding section, much useful advantages can be obtained. However, in a case where there is a restriction such as the use of the existing coding system, the different motion compensation prediction system may be used.

Also, a weighting coefficient used in weighting and adding of the preprocessing section may be adaptably controlled.

Furthermore, according to the present invention, there is provided a video decoding apparatus comprising a decoding section, having storing means for storing a past decoded picture signal, for generating a current decoded picture signal from a coded predictive error signal and motion vector data sent from a video coding apparatus, and the past decoded picture signal, and a post-processing section having means for deforming the current decoded picture signal decoded by the decoding section using the motion vector and the past decoded picture signal to generate a deformed decoded picture signal, and an adder for adding the deformed decoded picture signal and the current decoded picture signal to generate a final output video signal.

In this case, the above processing section provides the processing of reducing resolution of the decoded picture signal by weighting and adding the current decoded picture and a predictive picture signal obtained by a motion compensation prediction for the current decoded picture signal by use of a past decoded picture signal.

Generally, regarding the input video signal, in view of visual characteristics, it is difficult for human's eyes to recognize deterioration in an area having a motion or a large deformation where a motion compensation prediction is not easily well matched, and an area where a scene change is carried out. In consideration of this point, according to the video coding apparatus of the present invention, a low-pass filtering is provided to these area to selectively reduce resolution of the input video signal by the preprocessing. By such a preprocessing, the input video signal can be deformed to be easily coded by the motion compensation coding section without dropping the subjecting video quality in view of the visual characteristics, and the prediction error can be made small by the motion compensation prediction coding section. Thereby, the coding efficient can be improved, and the coding output amount can be smoothed.

In this case, the area where the video signal is deformed by the preprocessing is limited to the above-mentioned area. Due to this, unlike the conventional method in which the entire input video signal is changed by the low-pass filter processing, there can be expected an advantage in which no influence is exerted on the area having a small motion even if the area having a large motion and the area having a small motion coexist in the same screen, and rather noise is removed so that the video quality is improved. Since the motion compensation prediction to the motion of the video having a simple parallel motion is well matched, resolution is little deteriorated.

Moreover, if the preprocessing is structured to weight and add the input video signal and the prediction video signal obtained by subjecting the motion compensation prediction to the input video signal by use of the past picture signal, there can obtained an advantage in which the processing for checking the degree of which the motion compensation prediction is well matched and the filter processing are automatically performed by one operation. Also, the same system of the motion compensation prediction is used in both the preprocessing section and the motion compensation prediction coding section, thereby the prediction by the motion compensation prediction coding section can easily performed, and the coding output amount can be directly controlled.

Moreover, according to the video decoding apparatus of the present invention, similar to the preprocessing section, in the post-processing, which is provided in the back stage of the motion compensation prediction decoding section, the post-processing is subjected to the decoding video signal so as to reduce resolution of a region of the decoded picture signal according to a degree of a motion compensation prediction mismatch occurs in the region. Thereby, the subjective video quality can be improved by the same principle as the case in the preprocessing is performed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing a basic structure of a video coding apparatus of the present invention;

FIG. 2 is a block diagram showing the structure of one embodiment of the video coding apparatus of the present invention;

FIG. 3 is a block diagram showing the structure of the video coding apparatus of the other embodiment of the present invention;

FIG. 4 is a block diagram showing the structure of the video coding apparatus of the other embodiment of the present invention;

FIGS. 6A, 6B and 6C are views explaining a motion interpolation;

FIG. 7 is a block diagram showing an example of the structure of a motion interpolation processing section for realizing the operation of FIG. 6;

FIGS. 8A to 8G are views showing an overlap motion compensation;

FIG. 11 is a view showing one example showing the adoption of a value α of the embodiment of FIG. 10;

FIG. 14 is a view showing the relationship among an input of a video signal, the video signal after a motion compensation, and the video signal after a preprocessing in a c case where the input video signal has an interlace structure.

DETAILED DESCRIPTION OF THE PREFERRED EMBODIMENT

Figure 5A:
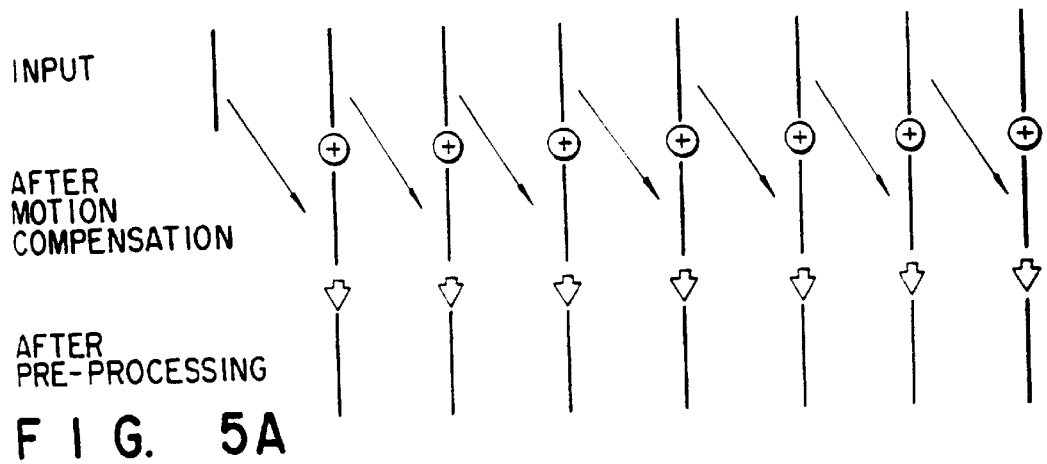
FIGS. 5A and 5B are views showing the relationship among an input of a video signal of FIGS. 2 and 3, the video signal after a motion compensation, and the video signal after a preprocessing.

FIG. 1 is a block diagram showing a basic structure of a video coding apparatus of the present invention.

For example, a video signal is inputted to a terminal 10 by a frame unit. The input video signal is supplied to a motion compensation prediction coding section 12 through a preprocessing section 11. The preprocessing section 11 comprises a motion compensation prediction estimating unit 13 and a filter 14. The motion compensation prediction estimating unit 13 estimates degree of which a motion compensation prediction is miss matched by the motion compensation prediction coding section 12. The filter 14 reduces resolution of the input video signal as degree of an area on a screen where a motion compensation prediction is miss matched becomes high based on the result of the above estimation of the motion compensation prediction estimating section 13.

The motion compensation prediction estimating section 13 compares the input video signal and a video signal, which is obtained by delaying the input video signal by, for example, one frame or one filed in the motion compensation prediction estimating section 13. Otherwise, the motion compensation prediction estimating section 13 compares the input video signal with a video signal after processing from the filter 14 or a local decoded signal, which is sent from a frame memory of the motion compensation prediction coding section 12. Thereby, the degree of which the motion compensation prediction is miss matched is estimated. As a result of the estimation, a video signal, which is generated as a prediction video signal, is sent to the filter 14, and the video signal is subjected to a low-pass filter processing with intensity corresponding to the degree of which the motion compensation prediction is miss matched.

FIG. 2 is a block diagram showing the structure of one embodiment of the video coding apparatus of the present invention. The preprocessing section 11 of FIG. 1 and the motion compensation prediction coding section 12 are specifically shown in FIG. 2.

In FIG. 2, in the preprocessing section 11, a predictive video signal, which was obtained by subjecting the motion compensation prediction to the input video signal of the present frame by a video signal of the past frame, and the input video signal of the present frame are weighted and added to each other. Thereby, there can be realized the preprocessing in which resolution of the input video signal can be reduced as degree of an area on a screen where a motion compensation prediction is miss matched becomes high.

More specifically, the input video signal input by the frame unit is stored in a frame memory 101 to be delayed by one frame. At the same time, input video signal is input to a motion compensation prediction circuit 102 and a multiplier 103. The motion compensation prediction circuit 102 compares the input video signal and the one-frame previous video signal inputted from the frame memory 101, and an inter-frame motion compensation predictive video signal by which the input video signal of the present frame is predicted from the one-frame previous video signal is prepared. The multiplier 103 multiplies the input video signal of the present frame by α ($0 \leq \alpha \leq 1$). A multiplier 104 multiplies the motion compensation inter-frame predictive video signal by $(1-\alpha)$. Outputs of the multipliers 103 and 104 are added to each other by an adder 105. The values α and $(1-\alpha)$ are weighting coefficients.

By the processing of the preprocessing section 11, in the area where the motion compensation prediction is well matched, the same video signals are superimposed on each other, thereby obtaining an advantage in which noise included in the input video signal is removed. Moreover, in the area where the motion compensation prediction is miss matched, resolution is reduced by superimposing signals having smaller correlation than the case of the area where the motion compensation prediction is well matched. It is noted that there is some correlation even in the latter case because the signals prepared by the motion compensation prediction are superimposed on each other.

In comparison between FIG. 1 and FIG. 2 in view of the preprocessing section 11, the frame memory 101 and the motion compensation prediction circuit 102 correspond to the motion compensation prediction estimating section 13 of FIG. 1. The multipliers 103 and 104, the adder 105, and the motion compensation prediction circuit 102 correspond to the filter section 14 of FIG. 1. In this case, the motion compensation prediction circuit 102 serves as both motion compensation prediction estimating section 13 and the filter 14.

In general, as the motion compensation prediction estimating section 13 of FIG. 1, there may be used a circuit in which an estimation is performed by calculating a motion compensation prediction error and comparing the calculated result with a predetermined threshold value. Also, the filter 14 of FIG. 14 may be structured by, for example, a spatial filter in which the weighting coefficient is changed every block. However, as shown in the embodiment of FIG. 2, if the preprocessing is performed by weighting and adding the input video signal and the predictive video signal, which was obtained by subjecting the motion compensation prediction to the input video signal of the present frame by use of a video signal of the past frame, the control of resolution can be automatically performed in accordance with degree of which the motion compensation is well matched by the same operation without the changing operation.

The above explained the processing of the preprocessing section 11 for preparing the input signal to the motion compensation prediction coding section 12. In this case, as the system of the motion compensation prediction, which is performed by the motion compensation prediction circuit 102, the above-mentioned patch motion compensation and the motion interpolation are preferably used in view of the point that no blocking artifacts are generated. In this case, the object lies in not the point that the optimal predictive video signal is prepared to the input video signal but the point that degree of which the motion compensation prediction is well matched is estimated to drop resolution in accordance with the estimation. Due to this, unlike the prior art, it is not necessary to provide the iterative operation for optimizing the motion vector. A vector interpolation may be performed based on the motion vector obtained by the block matching. Therefore, the amount of calculation may be smaller than that of the normal patch motion compensation and that of the motion interpolation. Moreover, the value α may be set to ½$^n$ (n: integer). In this case, the calculation of the multipliers 103 and 104 may be performed based on the bit shift calculation by the line connection of the multipliers, and no special hardware is needed. It is noted that α=1 corresponds to a case in which no preprocessing is provided, and that α=0 corresponds to a case in which the input signal to the motion compensation prediction coding section 12 is prepared by only the deformation of the previous frame (this is the easiest case for coding).

On the other hand, the motion compensation prediction coding section 12 may be structured to be completely the same as the conventional motion video coding apparatus (for example, an apparatus based on H. 261, which is an international standard system and MPEG). In this case, the rate control circuit is actually added as shown in an embodiment to be described late. Moreover, as a coding mode other than the motion compensation prediction, all modes, which are allowed in the conventional video coding apparatus, such as an inner frame coding, can be selected.

In the motion compensation prediction coding section 12, a the input video signal preprocessed by the preprocessing section 11 is inputted to a subtracter 106 and a motion compensation prediction circuit 111. The motion compensation prediction circuit 111 prepares a predictive video signal to the input video signal, which is preprocessed by the motion compensation inter-frame prediction, from the past local decoded video signal, which is inputted from the frame memory 110. Then, the prepared predictive video signal is sent to the subtracter 106. A difference between the predictive video signal and the preprocessed input video signal is obtained by the subtracter 106 to prepare a predictive error signal. The predictive error signal is coded by a predictive error coding circuit 107 to be outputted through a multiplexer/output buffer 112. The outputted signal is decoded by a predictive error decoding circuit 108, and is added to the predictive video signal sent from the motion compensation prediction circuit 111 by an adder 109, thereby obtaining a local decoded video signal. The local decoded video signal is stored in the frame memory 110. Motion vector data MV, which is detected for motion compensation, is also outputted from the motion compensation prediction circuit 111 to the multiplexer/output buffer 112. Then, the outputted signal and the predictive error signal coded from the prediction error coding circuit 107 are multiplexed to be outputted. The above-mentioned operation of the motion compensation prediction coding section 12 is basically the same as the conventional video coding apparatus.

The motion compensation prediction system by the motion compensation prediction circuit 102 of the preprocessing section 11 and the motion compensation prediction system by the motion compensation prediction circuit 111 of the motion compensation prediction coding section 12 may be set to be the same as each other. Thereby, among the preprocessed input video signals, the components prepared by the motion compensation prediction circuit 102 can be easily predicted, so that the error difference of the predictive error signals prepared by the subtracter 106 becomes small, and the coding efficient can be improved.

The following will explain the other embodiment of the video coding apparatus of the present invention.

FIG. 3 shows the other embodiment of the video coding apparatus, and is different from the embodiment of FIG. 2 in that the preprocessed video signal is used as an input to the frame memory 101 in the processing section 11. According to this embodiment, since the component prepared by the motion compensation prediction circuit 102 bears a close resemblance to a local decoding video signal, this embodiment is preferable in the case in which the motion compensation prediction system by the motion compensation prediction circuit 102 of the preprocessing section 11 and the motion compensation prediction system by the motion compensation prediction circuit 111 of the motion compensation prediction coding section 12 may be set to be the same as each other. In FIG. 3, the same reference numerals as FIG. 2 are added to the portions common to FIG. 2, and the explanation is omitted.

FIG. 4 shows the other embodiment of the video coding apparatus of the present invention, and is different from the above-mentioned embodiments in that the local decoding signal stored in the frame memory 110 of the motion compensation coding section 12 is used as an input to the frame memory 101 in the processing section 11. According to the structure of this embodiment, degree of which the actual compensation prediction is well matched by the motion prediction coding section can be reflected in the prediction result of the motion compensation prediction circuit 102 well. However, the video coding apparatus of this embodiment is desirably designed in consideration of the following points.

Specifically, coding noise enters the local decoding signal sent from the frame memory 110. Due to this, in a case where coding is performed at a low bit rate, there appears a tendency for an obtainable motion vector to deviate from a vector, which is reflected on the original motion, and unfavorable influence may be slightly exerted on the video. Moreover, coding noise is included in the preprocessed video signal. In FIG. 4, the same reference numerals as FIG. 2 are added to the portions common to FIG. 2, and the explanation is omitted.

Figure 5B:
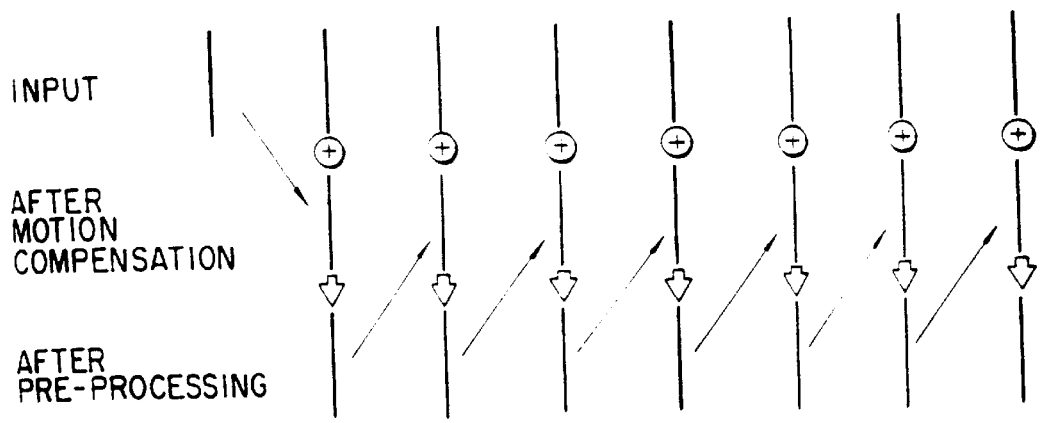

FIGS. 5A and 5B show the relationship among the input video signal, the predictive video signal after a motion compensation, and the video signal after a preprocessing in connection with the embodiments of FIGS. 2 and 3.

In the figure, an arrow shows which signal the motion compensation is performed based on, and a symbol + shows a weighting addition. In the embodiment of FIG. 4, the preprocessed video signal of the embodiment of FIG. 3 is replaced with the local decoding video signal.

FIGS. 6A, 6B and 6C explain the patch compensation and the motion interpolation for reference. As shown in FIG. 6A, when the motion vector of the block unit is obtained, the motion vector at each pixel position is calculated by a linear interpolation in accordance with the distance from the motion vector of the adjacent blocks. FIG. 6B is a view enlarging the frame shown by a broken line of FIG. 6A. A pixel extracted from the reference frame of the position, which is shown by the calculated motion vector, applies to each pixel, thereby preparing a motion compensation predictive video signal. In this case, the motion vector prepared by the interpolation has a decimal accuracy having less than one pixel, the pixel value is calculated by the linear interpolation from the surrounding four points as shown in FIG. 6C. In FIG. 6C, 0 shows a pixel position shown by the motion vector, and X shows a pixel of a reference picture.

FIG. 7 shows the structure of a motion interpolation processing section for realizing the operation of FIG. 6A to 6C. The motion interpolation processing section comprises a block motion vector detecting section 301, a motion vector memory 302, a motion vector interpolation section 303, a pixel interpolation section 304, and two frame memories 305 and 306.

An operation of the motion interpolation processing section will be explained as follows.

First, the reference video signal, which is used to predict the input video signal, is loaded onto the frame memory. Then, the input video signal and the reference video signal stored in the frame memory 305 are compared with each other by the block motion vector detecting section 301 to obtain a motion vector corresponding to each block. Then, the obtained motion vector is written to the motion vector memory 302. The block motion vector detecting section 301 comprises, for example, a motion vector detection circuit using the conventional block matching. Then, a value of the corresponding block and that of the peripheral block are read from the motion vector memory 302 by the motion vector interpolation section 303. Then, as referring to the read out motion vector values, the motion vector at the position of each of the pixels constructing the block is obtained by the interpolation calculation. The value obtained by adding the obtained motion vector to the address of each pixel indicates an address showing a pixel position to be read to each pixel from the reference video signal. However, in this case, since the above value becomes a decimal accuracy as mentioned above, the pixel interpolation section 304 generates the addresses of the surrounding four points to the frame memory 305, so that pixel values necessary for interpolation can be obtained. The pixel interpolation section 304 calculates the above-mentioned interpolation pixel value from these four pixel values to be written to the corresponding position of the frame memory 306, thereby a predictive video signal is formed on the frame memory 306.

As a motion compensation system in which no interblock gap of video signal contents is generated, there has been proposed another method, which is called an overlap motion compensation. The following will explain the method.

More specifically, according to the overlap motion compensation, the blocks are extracted such that the adjacent blocks are overlapped each other as shown in FIG. 8A. Regarding the respective blocks, the motion vector can be obtained by the block matching, similar to the normal motion compensation. For obtaining the motion compensation predictive signal, a reference block shifted from the reference frame to each block position by the motion vector is extracted to be used as a predictive signal. In this case, as shown in FIG. 8B, the extracted reference block is multiplied by a window function, and predictive values on a portion where these blocks are overlapped are added together, so that the result of the addition is used as a prediction value.

The window function is selected such that a sum of the weights of the overlapped windows to each pixel position becomes 1. For example, if the block is drawn such that the pixel position and the pixel value are set to be x-axis and y-axis, respectively, a continuous predictive signal can be obtained by weighting and overlapping the block as shown in FIG. 8D.

Figure 9:
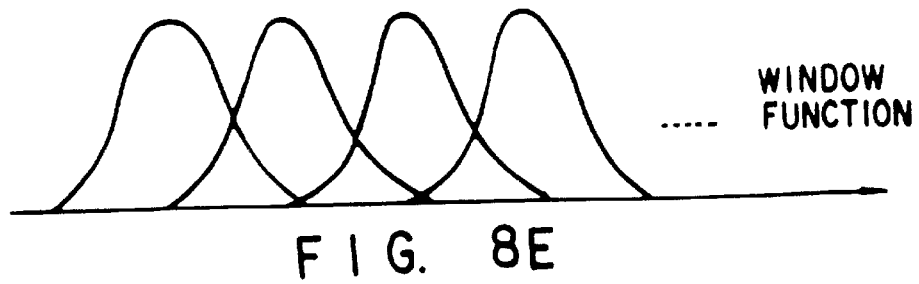
FIG. 9 is a block diagram showing a preprocessing section of FIG. 2 and a main part of a motion compensation prediction coding section when an overlap motion compensation is introduced.
Figure 9:
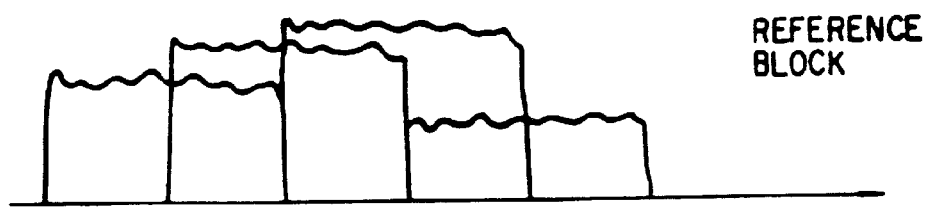
Figure 9:
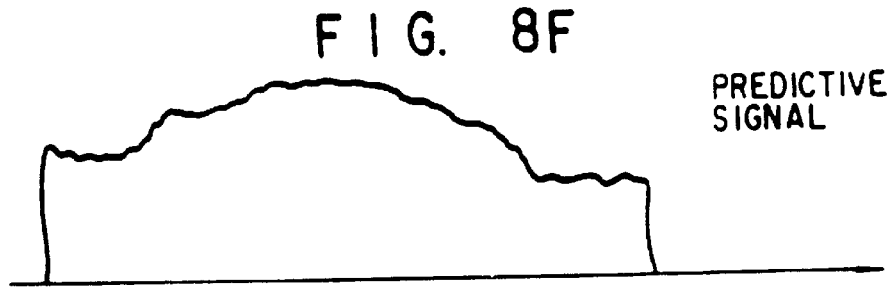
Figure 9:
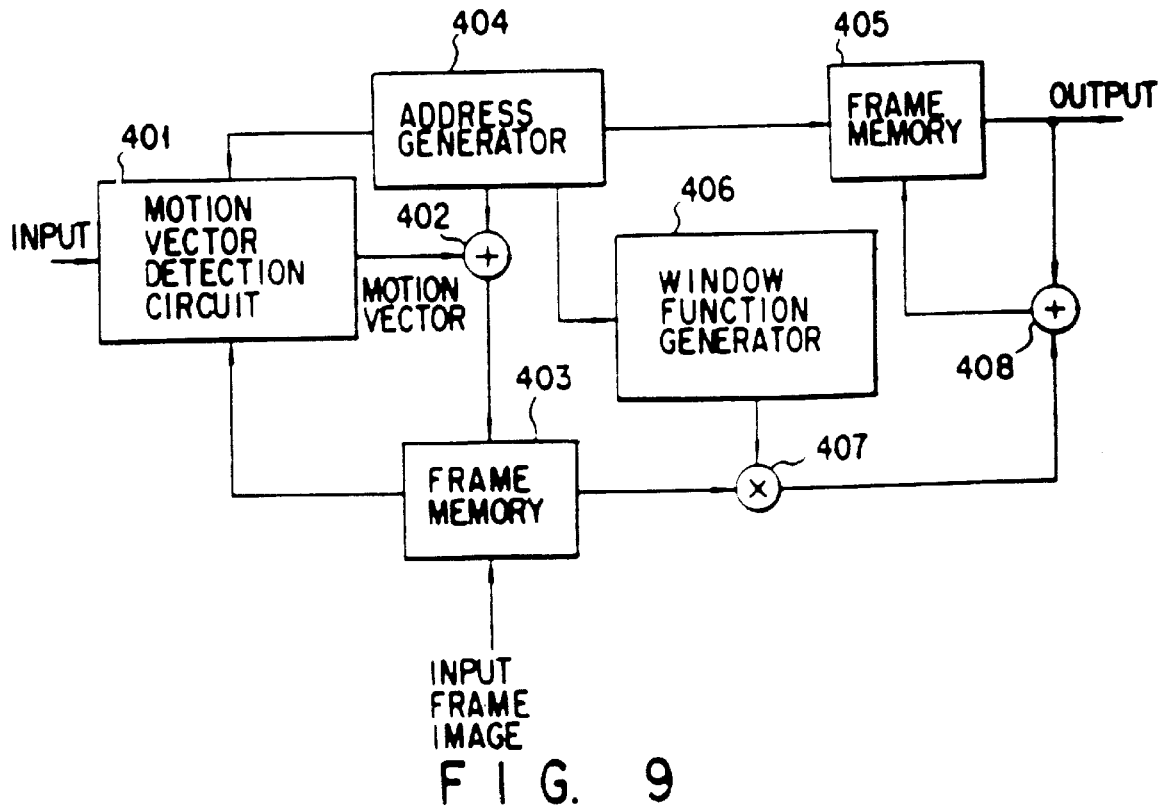

The above operation will be explained with reference to FIG. 9. FIG. 9 shows the specific structure of the frame memory 101 and the motion compensation prediction circuit 102 of the preprocessing section 11, or the frame memory 110 and the motion compensation prediction circuit 111.

In the drawing, a memory frame 403 corresponds to the frame memory 101 of FIG. 1 or the frame memory 110, and the previous frame video is stored therein. The input video and the previous frame video of the frame memory 403 are compared with each other by a motion vector detecting circuit 401, thereby a motion vector can be obtained and stored to correspond to the block position. In this case, this embodiment is different from the normal motion compensation in the point that the blocks are arranged such that the adjacent blocks are overlapped each other as already explained.

Next, an operation for forming a predictive signal in the frame memory 405 is carried out. At this time, the frame memory 405 is cleared by timing of preparation of the predictive signal of each frame to be initialized. Then, an address generator 404 sequentially generates an address to each block. An upper order bit of the address corresponds to the block position to be inputted to the motion vector detection circuit 401. A lower order bit corresponds to the address of the block to be inputted to a window function generator 406. Moreover, the address is directly inputted to the frame memory. Otherwise, the motion vector is added to the address, and inputted to the frame memory 403. The output of the frame memory 403 is multiplied by the window function generated by the window function generator 406, and the output of the frame memory 405 is added thereto to be written at the same position. This operation is provided to the block for one frame, thereby the predictive signal sent from the overlapped block is added onto the frame memory 405 and a continuous predictive signal is finally formed. The predictive signal is read to be used in predicting. For example, the predictive signal is inputted to the subtracter 106 of FIG. 2. After all signals for prediction are read out, data of the frame memory 403 is replaced with the previous frame video to the next input video. For example, data of the frame memory 403 is replaced with the local decoded video sent from the subtracter 106 of FIG. 2.

Figure 10:
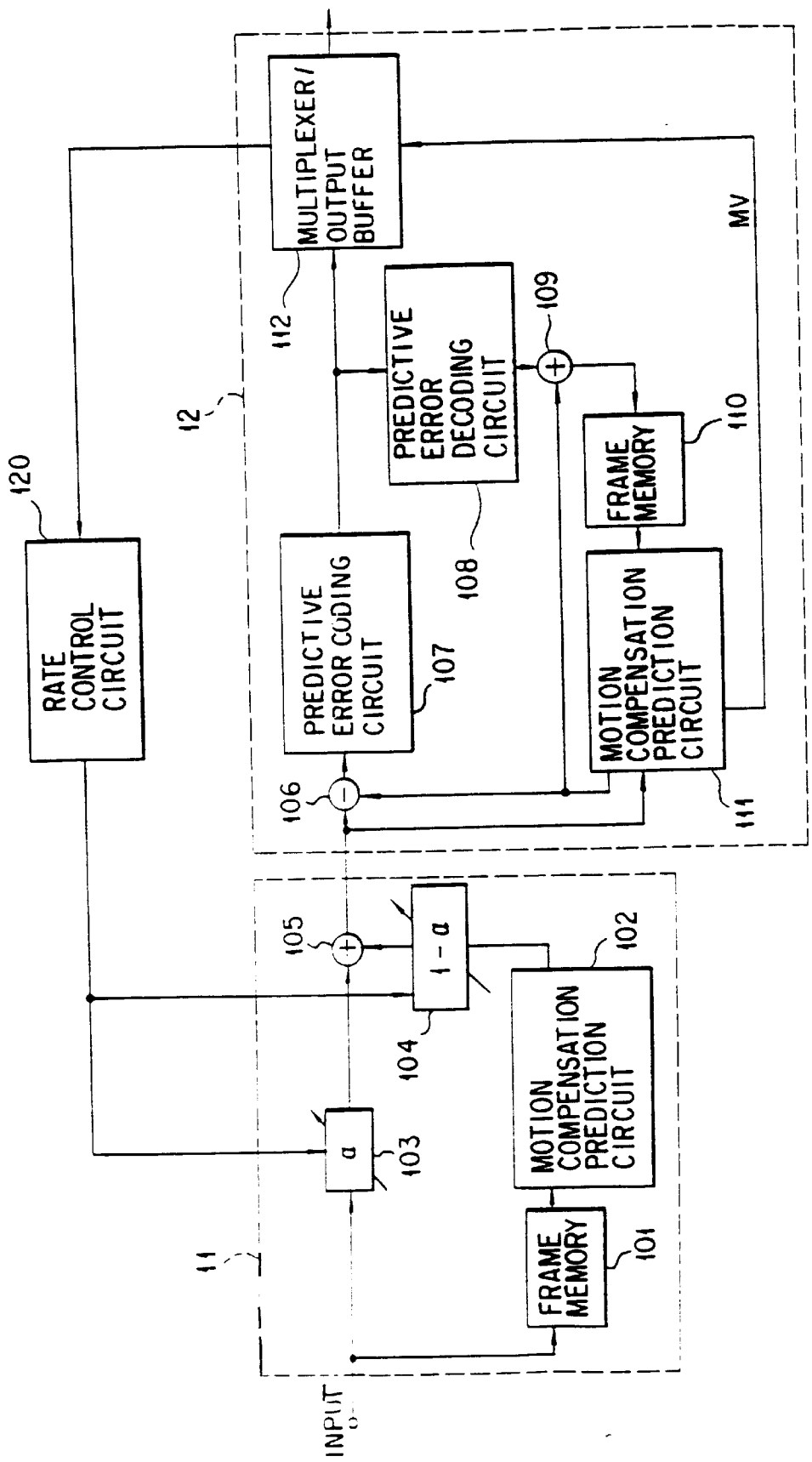
FIG. 10 is a block diagram showing the structure of the other embodiment of the video coding apparatus of the present invention.

The following will explain an embodiment in which the present invention is applied to a video coding apparatus having a rate control function. FIG. 10 is drawn based on the embodiment of FIG. 2. However, FIG. 10 may be drawn based on the embodiment of FIG. 3 or 4. In FIG. 10, a rate control circuit 120, which is omitted in FIG. 2, is shown.

According to this embodiment, at the time when the signal coded by the predictive error coding circuit 107 is sent to the multiplexer/output buffer 112 to be outputted, data of buffer occupying amount showing an amount of output buffer (amount of occupation) is sent to the rate control circuit 120 from the multiplexer/output buffer 112. The rate control circuit 120 controls the entire system so that it suppresses the generation of the code when the buffer occupying amount is high, and it increases the generation of the code when the buffer occupying amount is low. In the normal video coding apparatus, as shown in the drawing, a signal for controlling a quantization step size is sent to the prediction error coding circuit 107 from the rate control circuit 120.

In addition to such a normal rate control, the above embodiment is characterized in that the rate control is performed by sending the signal for controlling a weighting coefficient α and value of (1−α) to the multipliers 103 and 104 of the preprocessing section 11 from the rate control circuit 120. This rate control aims to solve the problem in which the blocking artifacts are generated if the rate control for controlling only the quantization step size is used. The above-mentioned rate control of this embodiment has a common point to the conventional rate control using the low-pass filter. For example, the preprocessing section 11 is operated at a value, which is close to α=1 in order not to prevent resolution from being reduced by the preprocessing when there are extra usable bits in the bit rate control. Then, only when there is no extra usable bits due to the change of scene and increase in motions, the preprocessing section 11 is operated at a value, which is close to α=0.

Unlike the embodiment of FIG. 2, the multipliers 103 and 104 are multipliers, which can change the value of coefficient α by a control signal sent from an external unit.

The reason why the coding output amount can be controlled by changing the value α is as follows.

More specifically, as the value α becomes close to 0, the components, which are prepared by only the deformation of the video of the previous frame to be included in the input video signal after the preprocessing, are increased. As a result, there can be obtained an video which can be easily coded. In FIG. 10, the same reference numerals as FIG. 2 are added to the portions common to FIG. 2, and the explanation is omitted.

In the embodiment of FIG. 10, the value α may be more positively controlled. FIG. 11 is one example showing the adoption of value α of the embodiment of FIG. 10. This example is similar to a periodical repetition of P picture and B picture, which is performed in MPEG.

Similar to the periodical repetition of P picture and B picture, the coding can be easily performed by the motion compensation prediction coding section 11 in a case of α=0.

However, SIR is lowered. If this state is continued, deterioration of the video is accumulated. In contrast, in a case of α=1, the state is the same as the case in which no preprocessing provided, the coding cannot be easily performed by the motion compensation prediction coding section 11. However, SNR (signal-to-noise ratio) is not lowered by the preprocessing. Therefore, if the state of α=0 (or value close to 0) is continued to the extent that deterioration is not prominent in the preprocessing section 11 and coefficient α is controlled to refresh values α and 1−α by sometimes setting α=1 (or value close to 1) by the rate control circuit 120, the total amount of codes can be saved without dropping the subjective quality of video much.

The above embodiments explained the processing in which resolution of the input video signal is reduced as degree of the area on the screen where the motion compensation prediction is miss matched becomes high by the video coding apparatus of the pre-processing section. However, according to the present invention, in the video coding apparatus, even if there is provided a post-processing section in which resolution of the decoding video signal is reduced as degree of the area on the screen where the motion compensation prediction is miss matched becomes high by the video coding apparatus, the similar advantage can be obtained.

Figure 12:
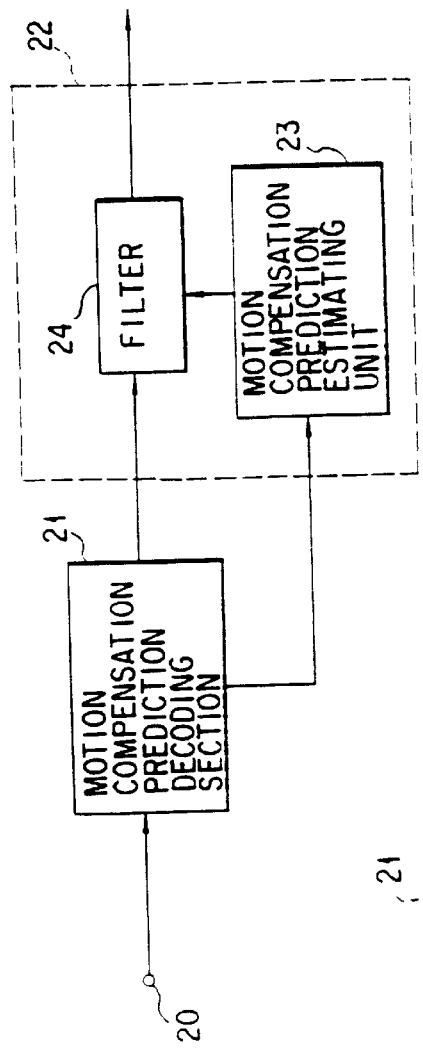
FIG. 12 is a block diagram showing a basic structure of a video decoding apparatus of the present invention.

FIG. 12 is a view showing a basic structure of the video decoding apparatus of the present invention. In the figure, a coding signal to be inputted to a terminal 20 is decoded by a motion compensation prediction decoding section 21, and inputted to a post-processing section 22. The post-processing section 22 comprises a motion compensation prediction estimating section 23 and a filter 24. The motion compensation prediction estimating section 23 estimates degree of which the motion compensation prediction is miss matched by the motion compensation prediction coding apparatus. The filter 24 reduces resolution of the decoding video signal from the compensation prediction decoding section 21 as degree of the area on the screen where the motion compensation prediction is miss matched becomes high based on the result of the above estimation of the motion compensation prediction estimating section 23. The motion compensation prediction estimating section 23 and the filter 24 perform basically the same processing as the case of the motion compensation prediction estimating section 13 and the filter 14 in the preprocessing section 11 of the video coding apparatus.

Figure 13:
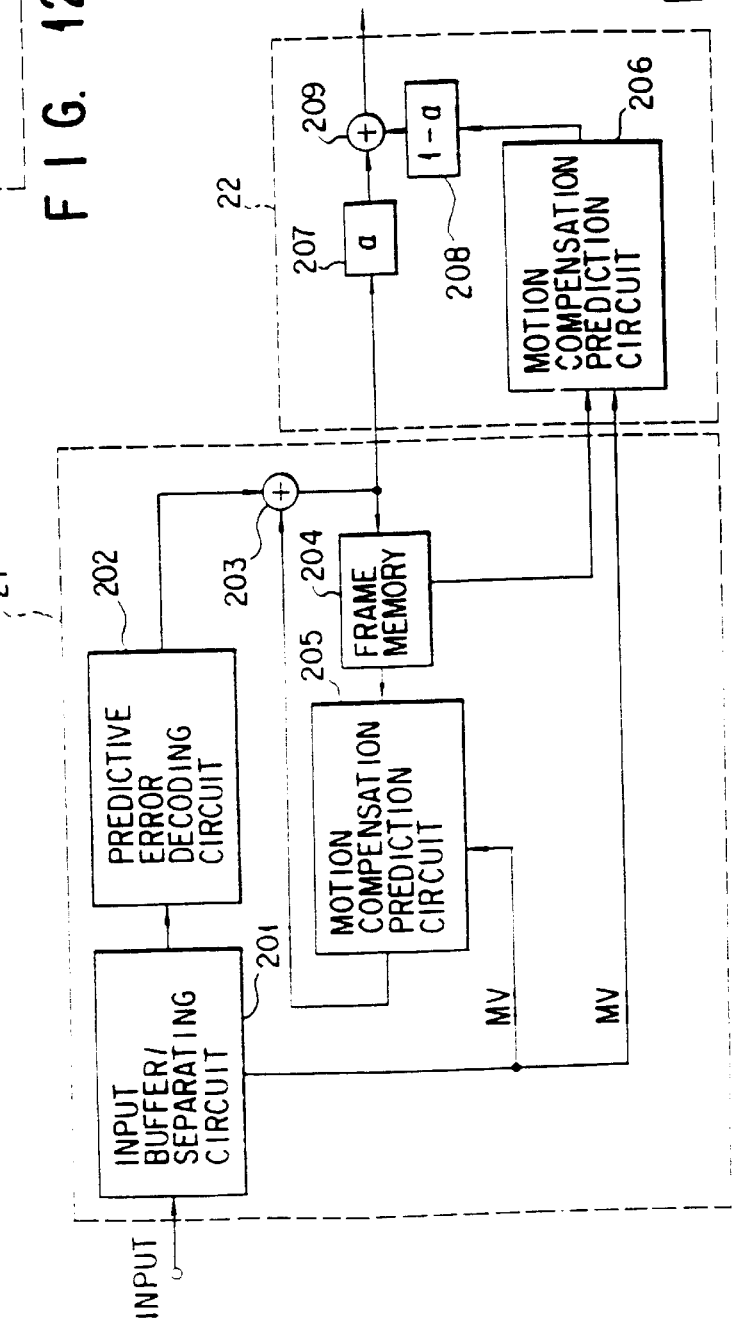
FIG. 13 is a block diagram showing the structure of one embodiment of the video decoding apparatus of the present invention.

FIG. 13 is a block diagram showing the structure of one embodiment of the video decoding apparatus of the present invention. In FIG. 13, the motion compensation prediction decoding section 21 and the post-processing 22 of FIG. 12 are specified.

In FIG. 13, a decoding signal obtained by the video coding apparatus (not shown) is provided as an input. The decoding signal is separated into a coding signal of a prediction error signal and motion vector data MV by an input buffer/separating circuit 201. Motion vector data MV is sent to a motion compensation prediction circuit 205 of the motion prediction decoding section 21 and a motion compensation prediction circuit 206 of the post-processing section 22. The coding signal of the prediction error signal is sent to a predictive error coding circuit 202. The prediction error signal is decoded by the predictive error coding circuit 202, and sent to an adder 203. On the other hand, the motion compensation prediction circuit 205 prepares a motion compensation prediction video signal from the past decoding video signal stored in the frame memory 204 based on motion vector data MV, and the motion compensation prediction video signal is sent to the adder 203. Both inputted signals are added by the adder 203, so that a decoding video signal is prepared and stored in the frame memory 204. Then, the post-processing is provided to the decoding video signal by the post-processing section 22 based on the same principle as the preprocessing.

More specifically, the motion compensation prediction circuit 206 forms a motion compensation predictive video signal for the above decoding video signal from the past decoding video signal (for example, one-frame previous decoding video signal) stored in the frame memory 204. In the video decoding apparatus, since motion vector data is sent from the video coding apparatus, no motion vector detection is needed in the motion compensation prediction circuit 206. Therefore, only a prediction video signal may be simply prepared by, for example, a patch motion compensation based on the sent motion vector. Then, the prepared prediction video signal and the decode video signal are weighted and added by multipliers 207 and 208 and an adder 209, thereby obtaining a final output video signal. These operations of the post-processing section 22 are the same as those of the preprocessing section 11 of the second embodiment of FIG. 2.

By the above-mentioned post-processing operation, processing for dropping resolution in only the area where the motion is large and blocking artifacts are generated is provided to the decode video signal, so that blocking artifacts can be shown not to be prominent. Moreover, in the video decoding apparatus, since neither the motion compensation prediction circuit 205 nor the motion compensation prediction circuit 206 does not perform the vector detection, there is an advantage in that the scale of the circuit may be small as compared with the corresponding circuit of the video coding apparatus.

In comparison between FIGS. 12 and 13 regarding the post-processing section 22, the frame memory 204 and the motion compensation prediction circuit 206 correspond to the motion compensation prediction estimating section 23 of FIG. 12, and the multipliers 207 and 208, and the adder 209, and the motion compensation prediction circuit 206 correspond to the filter 24 of FIG. 12. In this case, the motion compensation prediction circuit 206 serves as both motion compensation prediction estimating section 23 and filter 24. Moreover, in the post-processing section 22, the frame memory 204 of the motion compensation prediction decoding section 21 is used as the structural element.

Various types can be considered as an estimation reference by the motion compensation estimating section 23 of FIG. 12. For example, certainty of the sent motion vector data is estimated by the level of the accompanying prediction error, and intensity of the low-pass filter processing is changed in accordance with the result of the estimation. A signal, which is necessary to cover such general variations, is sent to the motion compensation prediction estimating section 23 from the motion compensation prediction decoding section 21. Moreover, the embodiment of FIG. 13 explained that the motion vector, which is sent from the video coding apparatus, was used. More generally, the motion vector may be obtained again from the decoding video signal and the past decoding video signal. In this case, the decode video signal is also inputted to the motion compensation estimating section 23.

The above explained the case in which the input video signal is coded by the frame unit. However, it is needless to say that the present invention can be applied to a case in which the input video signal is coded by the field unit. In this case, similar to the case of the motion compensation prediction coding, there can be considered three systems to perform the motion compensation prediction in the preprocessing section 11, that is, the prediction from the filed having the same parity, the prediction from one previous filed, and the prediction from both even- and odd-numbered fields, and any system may be used.

Moreover, even in a case where the input video signal is coded by the frame unit, the motion compensation prediction may be performed by the field unit in the preprocessing. Particularly, in a case where the input video signal has an interlace structure and the motion compensation prediction of the preprocessing section 11 is performed by the same parity field, thereafter assembling the fields to form a frame, the performance of the motion compensation prediction can be improved without having unfavorable influence caused by time difference between the respective fields forming the frame.

FIG. 14 is a view showing the above-mentioned state. More specifically, in FIG. 14, the relationship among the signals shown in FIG. 5B is rewritten to a case in which the motion compensation prediction is performed by the filed unit to be explained below. In this case, since the structure of the pre-processing section 11 is the same as that of FIG. 1, the explanation is omitted. As shown in FIG. 14, the odd-numbered field is preprocessed from only the odd-numbered field and the even-numbered field is preprocessed from only the even-numbered field. Thereafter, these frames are assembled to form the frame, so that a natural video signal after preprocessing can be formed. The natural video signal after preprocessing is contributed to improvement of the coding efficiency. Particularly, the above-mentioned structure is desirably used in making the best use of the feature of the coding system such as MPEG2, which is the international standard corresponding to the coding of the interlace video.

In FIG. 14, arrows and symbols + show the same meanings as those of FIGS. 5A and 5B. If a supplementary explanation is added, for example, a video signal after the preprocessing of field No. 6 can be obtained by weighting and adding an input video signal of field No. 6 and a predictive video signal for predicting the input video signal of field No. 6 by use of a video signal of field No. 4 after the preprocessing. FIG. 14 shows only the structure corresponding to the structure shown in FIG. 5B. However, it is needless to say that the structure corresponding to the other structure may be used.

Moreover, similar to the motion compensation prediction of the motion compensation prediction coding section 12, bidirectional predictions, which is used in MPEG can be applied to the motion compensation prediction of the preprocessing section 11. In this case, it is needed that increase in delay of the preprocessing section 11 be considered.

Moreover, in a case where a frame skipping is performed in the motion compensation prediction coding section 12, a frame thinning may be performed in the preprocessing section 11 to adjust to the frame thinning performed in the motion compensation prediction coding section 12. In a case where the coding and the frame thinning are adjusted to each other, the processing becomes more complicated. However, since the component prepared by the motion compensation prediction circuit 102 of the preprocessing section 11 bears a close resemblance to the local decoding video signal, there can be expected an advantage in which the coding can be easily performed by the motion compensation prediction coding section 12.

As explained above, according to the present invention, a video having a motion for originally generating a large amount of codes and a large deformation, or a video obtained by a scene change can be deformed to a video, which can be easily coded, by use of visual characteristics, and the coding output amount can be smoothed without dropping a subjective video quality, so that the subjective video quality and the coding efficient can be improved.

Unlike the prior art, even in the video in which the area where the motion is large and the area where the motion is small exist together in the same screen, the above advantage can be obtained without providing unfavorable influence to the area where the motion is small. In other words, in the small motion area or the parallel moving area, that is, the area where the motion compensation prediction is well matched, noise can be reduced by the function of time filter. Also, resolution is dropped in the area where the motion and deformation are large. As a result, the video can be deformed to be easily coded without having visually unfavorable influence. This processing can be realized by one mechanical processing.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A preprocessing device for preprocessing an input video signal, said preprocessing device being arranged on a pre-stage of a video coding apparatus having a motion compensation prediction section which generates a first prediction video signal, comprising:
    a frame memory for storing a previously inputted video signal;
    means for receiving and subjecting a currently inputted video signal to a motion compensation prediction by use of the previously inputted video signal received from said frame memory to generate a second prediction video signal; and
    means for generating a preprocessed video signal similar to the first prediction video signal, said generating of the preprocessed video signal being on the basis of the currently inputted video signal and the second prediction video signal; and
    means for inputting the preprocessed video signal to said motion compensation prediction section.

2. The preprocessing device according to claim 1, wherein said means for receiving and subjecting a currently inputted video signal to a motion compensation prediction performs the same motion compensation prediction as that of said motion compensation prediction section.

3. The preprocessing device according to claim 1, wherein said means for receiving and subjecting a currently inputted video signal to a motion compensation prediction subjects the currently inputted video signal to a motion compensation prediction similar to that performed by said motion compensation prediction section.

4. The preprocessing device according to claim 1, wherein said means for generating a preprocessed video signal includes means for weighting and adding the currently inputted video signal and the second prediction video signal to generate the preprocessed video signal.

5. The preprocessing device according to claim 4, which includes means for controlling adaptively weighting coefficients used in said means for weighting and adding the currently inputted video signal and the second prediction video signal.

6. The preprocessing device according to claim 1, wherein said means for receiving and subjecting a currently inputted video signal to a motion compensation prediction includes means for generating a continuous prediction video signal without blocking artifacts to the currently inputted video signal.

7. The preprocessing device according to claim 2, wherein said means for generating further includes means for overlapping blocks to each other to obtain the continuous prediction video signal.

8. A video coding apparatus comprising:
    a preprocessing section for preprocessing an input video signal, including,
        a frame memory for storing a previous coded video signal,
        means for receiving and subjecting a currently inputted video signal to a first motion compensation prediction by use of the previous coded video signal received from said frame memory to generate a first prediction video signal, and
        means for generating a preprocessed video signal on the basis of the currently inputted video signal and the first prediction video signal; and
    a motion compensation prediction coding section arranged on a rear-stage of said preprocessing section, including,
        means for receiving and subjecting the preprocessed video signal to a second motion compensation prediction to generate a second prediction video signal, said first and second prediction video signals being similar,
        prediction error generating means for obtaining a difference between the second prediction video signal and the preprocessed video signal to generate a prediction error signal; and
        coding means for coding the prediction error signal to be output.

9. The video coding apparatus according to claim 8, wherein said means for receiving and subjecting a currently inputted video signal to a first motion compensation prediction in said preprocessing section performs a same motion compensation prediction as that of said means for receiving and subjecting the preprocessed video signal to a second motion compensation prediction.

10. The video coding apparatus according to claim 8, wherein said means for receiving and subjecting a currently inputted video signal to a first motion compensation prediction subjects the currently inputted video signal to a motion compensation prediction similar to that performed by said means for receiving and subjecting the preprocessed video signal to a second motion compensation prediction.

11. The video coding apparatus according to claim 8, wherein said means for generating a preprocessed video signal includes means for weighting and adding the currently inputted video signal and the first prediction video signal to generate the preprocessed video signal.

12. The video coding apparatus according to claim 11, which includes means for controlling adaptively weighting coefficients used in said means for weighting and adding the currently inputted video signal and the first prediction video signal.

13. The video coding apparatus according to claim 8, wherein said means for receiving and subjecting a currently inputted video signal to a first motion compensation prediction includes means for generating a continuous prediction video signal without blocking artifacts to the currently inputted video signal.

14. The video coding apparatus according to claim 13, wherein said means for generating further includes means for overlapping blocks to each other to obtain the continuous prediction video signal.

15. A preprocessing device for preprocessing an input video signal, said preprocessing device being arranged on a pre-stage of a video coding apparatus having a first motion compensation prediction section which generates a first prediction video signal, comprising:

a frame memory which stores a previously inputted video signal;

a second motion compensation prediction section which receives and subjects a currently inputted video signal to a motion compensation prediction similar to that performed by said first motion compensation prediction section by use of the previously inputted video signal received from said frame memory to generate a second prediction video signal; and a preprocessed video signal generator which generates a preprocessed video signal similar to the first prediction video signal on the basis of the received currently inputted video signal and the received second prediction video signal, and inputs the preprocessed video signal to said first motion compensation prediction section.

16. A video coding apparatus comprising:

a preprocessing section configured to preprocess an input video signal, comprising, a frame memory configured to store a previous coded video signal;

a first motion compensation prediction section configured to receive and subject a currently inputted video signal to a first motion compensation prediction using the previous coded video signal received from said frame memory to generate a first prediction video signal, and a preprocessed video signal generator which generates a preprocessed video signal on the basis of the currently inputted video signal and the first prediction video signal; and a motion compensation prediction coding section arranged on a rear-stage of said preprocessing section, including, a second motion compensation prediction section configured to receive and subject the preprocessed video signal to a second motion compensation prediction to generate a second prediction video signal, wherein the first and second motion compensation predictions are similar and the first and second prediction video signals are similar, a prediction error generator configured to obtain a difference between the second prediction video signal and the preprocessed video signal to generate a prediction error signal, and a coder configured to code the prediction error signal to be output.

* * * * *